United States Patent
Ko et al.

(10) Patent No.: US 6,864,326 B2
(45) Date of Patent: Mar. 8, 2005

(54) PROCESS FOR POLYMER HYDROGENATION USING LITHIUM HYDRIDE PREPARED FROM REACTOR EQUIPPED WITH HIGH-SPEED INJECTION NOZZLE

(75) Inventors: Young-Hoon Ko, Taejeon (KR); Hoo-Chae Kim, Taejeon (KR); Jae-Yun Kim, Taejeon (KR); Jin-Man Hwang, Seoul (KR)

(73) Assignee: Korea Kumho Petrochemical Co., Ltd. (KR)

( * ) Notice: Subject to any disclaimer, the term of this patent is extended or adjusted under 35 U.S.C. 154(b) by 0 days.

(21) Appl. No.: 10/653,664

(22) Filed: Sep. 2, 2003

(65) Prior Publication Data

US 2004/0132916 A1 Jul. 8, 2004

(30) Foreign Application Priority Data

Jan. 4, 2003 (KR) ................................. 10-2003-0000403

(51) Int. Cl.$^7$ ............................................... C08C 19/02
(52) U.S. Cl. ................. 525/338; 525/331.9; 525/332.9; 525/333.1
(58) Field of Search ........................... 525/338, 331.9, 525/332.9, 333.1

(56) References Cited

U.S. PATENT DOCUMENTS

| | | |
|---|---|---|
| 3,494,942 A | 2/1970 | Miki et al. |
| 3,634,594 A | 1/1972 | Hiyama |
| 3,670,054 A | 6/1972 | De La Mare et al. |
| 3,700,633 A | 10/1972 | Wald et al. |
| 4,501,857 A | 2/1985 | Kishimoto et al. |
| 4,673,714 A | 6/1987 | Kishimoto et al. |
| 4,980,421 A | 12/1990 | Teramoto et al. |
| 5,039,755 A | 8/1991 | Chamberlain et al. |
| 5,132,372 A | 7/1992 | Chamberlain et al. |
| 5,206,307 A | 4/1993 | Chamberlain et al. |
| 5,583,185 A | 12/1996 | Parellada Ferrer et al. |
| 5,925,717 A * | 7/1999 | De Boer et al. ............ 525/338 |
| 6,410,657 B1 * | 6/2002 | Ko et al. .................... 525/338 |

OTHER PUBLICATIONS

U.S. Appl. No. 09/555,161, filed Jul. 2000, Ko et al.

* cited by examiner

*Primary Examiner*—Roberto Rabago
(74) *Attorney, Agent, or Firm*—Dilworth & Barrese LLP

(57) ABSTRACT

The present invention relates to a process for polymer hydrogenation that includes: polymerizing or copolymerizing at least one conjugated diene in a hydrocarbon solvent using an organic alkali metal polymerization initiator to generate a living polymer; adding a terminating agent selected from amines, esters, ketones, or halogen compounds to deactivate the active terminal of the living polymer; and selectively hydrogenating the conjugated diene polymer using at least one organotitanium compound and a lithium hydride, which is prepared from a reactor equipped with a high-speed injection nozzle and thereby precisely controlled in regard to particle diameter. The lithium hydride as used in this process is a highly active lithium hydride having a precisely controlled particle diameter as prepared from a reactor equipped with a high-speed injection nozzle to acquire stable hydrogenation reaction rate and hydrogenation reproducibility, and particularly allow the quantitative control of the lithium hydride/titanium mole ratio in the hydrogenation of the conjugated diene polymer having different molecular weights, thereby maintaining a high hydrogenation activity.

8 Claims, No Drawings

PROCESS FOR POLYMER HYDROGENATION USING LITHIUM HYDRIDE PREPARED FROM REACTOR EQUIPPED WITH HIGH-SPEED INJECTION NOZZLE

CROSS REFERENCE TO RELATED APPLICATIONS

This application claims priority to Korean Patent Application No. 10-2003-0000403 under 35 U.S.C. §119.

BACKGROUND OF THE INVENTION

1. The Field of the Invention

This invention relates to a process for polymer hydrogenation using, as a cocatalyst, a highly active lithium hydride prepared from a reactor equipped with a high-speed injection nozzle in a method for selectively hydrogenating the unsaturated double bond in the conjugated diene unit of a conjugated diene polymer or a copolymer containing a conjugated diene by using an organotitanium hydrogenation catalyst.

2. Related Prior Art

There have been reported several methods for hydrogenating or selectively hydrogenating the unsaturated double bond in conjugated diene polymer. For example, U.S. Pat. Nos. 3,494,942; 3,634,594; 3,670,054; and 3,700,633 disclose methods of using an appropriate catalyst known in the prior art, particularly a catalyst or a catalyst precursor containing a group VIII metal for the sake of hydrogenating or selectively hydrogenating a polymer containing an ethylenic unsaturated double bond, or a polymer containing aromatic and ethylenic unsaturated double bonds.

The catalyst used in these methods is prepared by mixing a Group VIII metal (e.g., Ni or Co) compound with an appropriate reducing agent (e.g., aluminum alkyl). Here, the Group VIII metal compound is combined with Group I-A, II-A or III-B metal alkyl or hydride at a concentration sufficient to provide Group I-A, II-A and/or III-B metal to Group VIII metal ratios within the range from about 0.1:1 to about 20:1, preferably from about 1:1 to about 10:1.

As suggested in the prior art, the hydrogenation catalyst is typically prepared by mixing a Group VIII metal compound with a reducing agent in an appropriate solvent or a diluent in the temperature range of 20 to 60° C. before it is added to the hydrogenation reactor.

U.S. Pat. No. 4,501,857 reveals that the double bonds in a conjugated diene polymer can be selectively hydrogenated in the presence of at least one bis(cyclopentadienyl)titanium compound and at least one alkyl lithium compound.

U.S. Pat. No. 4,980,421 also discloses that the similar activity of hydrogenation can be provided by adding a bis(cyclopentadienyl)titanium compound with an alkoxy lithium compound at an appropriate mixing ratio, or mixing an alkoxy lithium compound, which can be used in combination with an alcohol or phenol compound, and a bis(cyclopentadienyl)titanium compound. According to this related document, the catalyst has such a high activity that it can be used in a small amount without adversely affecting the stability of the hydrogenated polymer, and the deashing step is not required in this method.

U.S. Pat. No. 4,673,714 discloses that a bis(cyclopentadienyl)titanium compound preferably hydrogenates the double bond of a conjugated diene without a need of using alkyl lithium. The specific examples of the titanium compound include a bis(cyclopentadienyl)titanium diaryl compound. As mentioned in the document, the advantage of this catalyst system is that there is no need of using an alkyl lithium compound.

U.S. Pat. No. 5,583,185 describes a method for hydrogenating the double bond of a conjugated diene in a living polymer using a homogeneous catalyst represented by the formula $Cp_2Ti(PhOR)_2$ (where Cp is cyclopentadienyl; and OR is an alkoxy compound having 1 to 4 carbon atoms) or $Cp_2TiR_2$ (where R is $CH_2PPh_2$), and an organic alkali metal compound as a polymerization initiator.

U.S. Pat. No. 5,039,755 suggests a method for conjugated diene polymer hydrogenation that involves polymerizing or copolymerizing a conjugated diene monomer in the presence of an organic alkali metal compound as a polymerization initiator in an appropriate solvent to produce a living polymer. The polymerization is terminated by the addition of hydrogen to the produced living polymer. The selective hydrogenation of the double bond in the conjugated diene unit of the terminated polymer is performed in the presence of a catalyst represented by $(C_5H_5)_2TiR_1R_2$ (where $R_1$ and $R_2$ are the same or different and selected from the group consisting of $C_1$ to $C_8$ alkyl or alkoxy, or $C_6$ to $C_8$ aryloxy, arylalkyl, cycloalkyl, silyl or carbonyl). The hydrogenation step is performed without an alkyl lithium or alkoxy lithium compound. From this patent, U.S. Pat. Nos. 5,132,372 and 5,206,307 disclose the use of alkylbenzoate as an accelerator for enhancing the hydrogenation reaction.

In addition, U.S. patent application Ser. No. 09/555,161, now abandoned suggests a method for selectively hydrogenating a conjugated diene that includes polymerizing or copolymerizing at least one conjugated diene using an organic alkali metal as an initiator to prepare a living polymer, adding a terminating agent to deactivate the living terminal of the living polymer, and adding a lithium hydride and a monocyclopentadienyl titanium compound with hydrogen to the terminal-deactivated polymer to selectively hydrogenate the conjugated diene.

In the above-stated methods, particularly disclosed in U.S. Pat. Nos. 5,039,755; 5,132,372; and 5,206,307, and U.S. patent application Ser. No. 09/555,161, now abandoned the addition of lithium hydride as a reducing agent in a general batch reactor involves adding a hydrogen gas to the mixing container of alkyl lithium through a sparger, requiring a vigorous stirring at more than 1000 rpm so as to reduce the reaction time, and the end point of the reaction is delayed with an increase in the scale of the reaction, increasing the particle diameter to rapidly deteriorate the activity of lithium hydride as a reducing agent. Accordingly, the use of the conventional batch reactor is disadvantageous in that the preparation of highly active lithium hydride having a precisely controlled particle diameter is impossible to realize on a commercial scale.

SUMMARY OF THE INVENTION

In an attempt to improve the problems with the hydrogenation methods as disclosed in U.S. Pat. Nos. 5,039,755; 5,132,372; and 5,206,307, and U.S. patent application Ser. No. 09/555,161, now abandoned in aspect to production on a large scale, the inventors of the present invention have figured out that, in the preparation of lithium hydride used as a reducing agent of the cocatalyst in the process of polymer hydrogenation, the use of a highly active lithium hydride having a precisely controlled particle diameter as prepared by adding hydrogen through a high-speed injection nozzle in a reactor and reacting the injected hydrogen with alkyl lithium can acquire stable hydrogenation reaction rate and hydrogenation reproducibility, improve the inefficiency such as long reaction time and uneconomic aspect of requiring high pressure and high-speed stirring in the conventional method of reacting the active terminal of the living polymer or the alkyl lithium with hydrogen gas, and especially allow the quantitative control of the lithium hydride/titanium mole ratio in the hydrogenation of the conjugated diene polymer having different molecular weights, thereby maintaining a high hydrogenation activity.

It is therefore an object of the present invention to provide a method for polymer hydrogenation that uses a highly active lithium hydride having a precisely controlled particle diameter as prepared from a reactor equipped with a high-speed injection nozzle to acquire stable hydrogenation reaction rate and hydrogenation reproducibility, improve the inefficiency such as long reaction time and uneconomic aspect of requiring high pressure and high-speed stirring in the conventional method of reacting the active terminal of the living polymer or the alkyl lithium with hydrogen gas, and allow the quantitative control of the lithium hydride/titanium mole ratio in the hydrogenation of the conjugated diene polymer having different molecular weights, thereby maintaining a high hydrogenation activity.

To achieve the above object of the present invention, there is provided a method for conjugated diene polymer hydrogenation that includes: polymerizing or copolymerizing at least one conjugated diene in a hydrocarbon solvent using an organic alkali metal polymerization initiator to generate a living polymer; adding a terminating agent selected from amines, esters, ketones or halogen compounds to deactivate the active terminal of the living polymer; and selectively hydrogenating the conjugated diene polymer using at least one organotitanium compound represented by the following formula 1 and a highly active lithium hydride, which is prepared from a reactor equipped with a high-speed injection nozzle and thereby precisely controlled in regard to particle diameter:

Formula 1

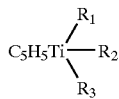

where $R_1$ is selected from the group consisting of cyclopentadienyl, $C_1$ to $C_8$ alkoxy, $C_6$ to $C_{20}$ aryloxy, or halogen; and $R_2$ and $R_3$ are the same or different, and selected from the group consisting of halogen, $C_1$ to $C_8$ alkyl or alkoxy, $C_6$ to $C_{20}$ arylalkyl or aryloxy, or $C_7$ to $C_{20}$ alkoxyaryl or carbonyl.

Now, the present invention will be described in further detail as follows.

The hydrogenation process of the present invention follows the known method of selectively hydrogenating a conjugated diene polymer using an organotitanium compound represented by the formula 1 as a main catalyst, and lithium hydride as a cocatalyst. The lithium hydride used as a cocatalyst is a highly active lithium hydride having a precisely controlled particle diameter.

More specifically, the hydrogenation process includes a first step of polymerizing at least one polyolefin, particularly diolefin, or copolymerizing at least one polyolefin with at least one alkenyl aromatic hydrocarbon monomer to prepare a copolymer containing both an ethylenic unsaturated double bond and an aromatic unsaturated double bond.

The copolymer can be of a structure random, tapered, block or a combination of these as well as linear, star-like, or radial.

The copolymer containing both an ethylenic unsaturated double bond and an aromatic unsaturated double bond can be prepared by using an anionic initiator or a polymerization catalyst, such as an organolithium compound. The preparation method of the polymer can be a known method, e.g., bulk, solution, or emulsion polymerization.

The specific examples of the conjugated diene anionically polymerizable may include conjugated diene compounds containing 4 to 12 carbon atoms (e.g., 1,3-butadiene, isoprene, piperylene, phenylbutadiene, 3,4-dimethyl-1,3-hexadiene, 4,5-diethyl-1,3-octadiene, etc.), and preferably conjugated diolefins containing 4 to 9 carbon atoms.

The specific examples of the alkenyl aromatic hydrocarbon copolymerizable with the conjugated diene compound may include styrene, alkyl-substituted styrene, alkoxy-substituted styrene, or vinyl aryl compounds such as 2-vinyl pyridine, 4-vinyl pyridine, vinyl naphthalene, or alkyl-substituted vinyl naphthalene.

Subsequently, a terminating agent of the same equivalent as the living polymer is added so as to deactivate the terminal of the living polymer. The terminating agent as used herein can be selected from amines, esters, ketones, or halogen compounds. The specific examples of the terminating agent may include benzyl chloride, benzyl bromide, benzyl iodide, methyl chloride, methyl bromide, methyl iodide, ethyl chloride, ethyl bromide, ethyl iodide, butyl chloride, butyl bromide, butyl iodide, acetone, methylisobutylketone, diphenylketone, methanol, ethanol, isopropylalcohol, butanol, phenol, cresol, 2,6-di-t-butyl-4-methyl phenol, ethylacetate, butylacetate, trimethylsilylfluoride, trimethylsilylchloride, trimethylsilylbromide, trimethylsilyliodide, triethylsilylfluoride, triethylsilylchloride, triethylsilylbromide, triethylsilyliodide, tributylsilylfluoride, tributylsilylchloride, tributylsilylbromide, tributylsilyliodide, triphenylsilylfluoride, triphenylsilylchloride, triphenylsilylbromide, or triphenylsilyliodide.

The hydrogenation reaction of the present invention is performed using a polymer prepared by polymerizing a conjugated diene in an inert solvent.

The term "inert solvent" as used herein refers to a hydrocarbon solvent not reactive to any reactant in the hydrogenation reaction. The specific examples of the inert solvent may include aliphatic hydrocarbons (e.g., n-pentane, n-hexane, n-heptane, or n-octane); aliphatic cyclic hydrocarbons (e.g., cyclohexane, or cycloheptane); ethers (e.g., diethylether, or tetrahydrofuran); or mixtures of these compounds.

Alternatively, aromatic hydrocarbons such as benzene, toluene, xylene, or ethylbenzene can be used so long as their aromatic double bond is not hydrogenated in the selected hydrogenation condition.

After the addition of the terminating agent to deactivate the active terminal of the living polymer, the conjugated diene polymer is selectively hydrogenated using an organotitanium compound represented by the formula 1 and a highly active lithium hydride having a precisely controlled particle diameter as prepared from a reactor equipped with a high-speed injection nozzle.

The process for preparing a highly active lithium hydride having a precisely controlled particle diameter from a reactor equipped with a high-speed injection nozzle includes adding hydrogen to alkyl lithium.

The use of a general batch reactor, in which a hydrogen gas is added to an alkyl lithium mixing container through a sparger, requires a vigorous stirring, such as stirring at 1000 rpm or more, in order to reduce the reaction time and, for a larger-scaled reaction, delays the end point of the reaction, and increases the particle diameter with a rapid deterioration of the activity as a reducing agent. It is therefore actually impossible to prepare highly active lithium hydride having a precisely controlled particle diameter on a commercial business scale using the conventional batch reactor. Such a gas-liquid reaction process mainly depends on efficiency of the gas contact device, gas solubility, and temperature. Contrarily, the present invention uses a reactor equipped with a high-speed injection nozzle for adding hydrogen to alkyl lithium to control the particle diameter of lithium hydride within 2000 nanometers, preferably within 500 nanometers. Advantageously, the use of a reactor equipped with a high-speed injection nozzle as in the present invention hardly affects the particle diameter and activity of lithium hydride in the preparation process on a commercial business scale. With the reactor having a high-speed injection nozzle, the reaction is performed at a temperature of 0 to 30° C. with a hydrogen pressure of 0 to 50 kgf/cm$^2$, preferably 5 to 20 kgf/cm$^2$.

In the addition reaction of hydrogen to alkyllithium, a Lewis base is used to enhance the reactivity of the alkyl lithium. The Lewis base as used herein includes ethers such as diethylether or tetrahydrofuran. The added amount of the Lewis base is preferably in the range of 2- to 20-fold moles of the alkyl lithum. If the mole ratio of the Lewis base to alkyl lithium is less than 2, then the activity is deteriorated to require too much time to reach the end point of the reaction; otherwise, if the mole ratio of the Lewis base to alkyl lithium exceeds 20, then the overuse of the expensive ethers is much uneconomic and possibly causes side reactions.

The catalyst for the hydrogenation reaction of the present invention is an organotitanium compound represented by the formula 1, and prepared by dissolving or suspending a bis(cyclopentadienyl)titanium compound or a monocyclopentadienyl titanium compound in an appropriate solvent.

The specific examples of the organotitanium compound represented by the formula 1 may include a bis(cyclopentadienyl)titanium compound selected from the group consisting of bis(cyclopentadienyl)titanium difluoride, bis(cyclopentadienyl)titanium dichloride, bis(cyclopentadienyl)titanium dibromide, bis(cyclopentadienyl)titanium diiodide, bis(cyclopentadienyl) titanium dicarbonyl, bis(cyclopentadienyl)titanium dimethyl, bis(cyclopentadienyl)titanium diethyl, bis(cyclopentadienyl)titanium dibutyl, bis(cyclopentadienyl) titanium dibenzyl, bis(cyclopentadienyl)titanium dihexyl, or mixtures of these compounds; a monocyclopentadienyl titanium compound selected from the group consisting of monocyclopentadienyl(2,6-di-t-butyl-4-methylphenoxy) titanium difluoride, monocyclopentadienyl(2,6-di-t-butyl-4-methylphenoxy)titanium dichloride, monocyclopentadienyl (2,6-di-t-butyl-4-methylphenoxy)titanium dibromide, monocyclopentadienyl(2,6-di-t-butyl4-methylphenoxy) titanium diiodide, monocyclopentadienyl(2,6-di-t-butylphenoxy)titanium dichloride, or monocyclopentadienyl(2,6-di-t-butyl-4-methylphenoxy) titanium dichloride; or mixtures of the bis(cyclopentadienyl) titanium compound and the monocyclopentadienyl titanium compound.

The added amount of the hydrogenation catalyst is preferably, based on 100 g of the polymer, 0.01 to 20 mmol, more preferably 0.05 to 2 mmol.

The mole ratio of the lithium hydride to the titanium in the hydrogenation catalyst is preferably 2:1 to 30:1.

If the mole ratio of the lithium hydride to titanium in the hydrogenation catalyst is less than 2:1, then the activity of the hydrogenation catalyst is deteriorated to require too much time to reach the end point of the reaction and poor hydrogenation yield; otherwise, if the mole ratio of the lithium hydride to titanium in the hydrogenation catalyst exceeds 30:1, then the overuse of the expensive lithium hydride is much uneconomic and would cause the requirement of the unnecessary neutralization process during the finishing process.

Using the hydrogenation catalyst, hydrogen can be selectively added to the unsaturated double bonds of the conjugated diene part in the homopolymer of the conjugated diene monomers or in the copolymer with a copolymerizable vinyl-substituted aromatic monomers. Such polymers would be a random or block copolymer and have a molecular weight of 500 to 1,000,000.

In the hydrogenation reaction of the present invention, the concentration of the polymer is, based on the solvent, 1 to 50 wt. %, preferably 5 to 25 wt. %.

The hydrogenation reaction of the present invention is performed in the procedures of maintaining a polymer solution at a predetermined temperature in the hydrogen or inert gas atmosphere, adding a hydrogenation catalyst with/ without stirring, and introducing hydrogen gas with a predetermined pressure.

The term "inert gas" as used herein refers to a gas not reactive to any reactant of the hydrogenation reaction. Air or oxygen, which oxidizes or decomposes the hydrogenation catalyst to deteriorate the activity of the catalyst, is not preferred.

For the hydrogenation reaction, the reaction temperature is in the range of 0 to 150° C. The reaction temperature of below 0° C. deteriorates the hydrogenation reaction rate as well as the activity of the catalyst, thus uneconomically requiring an excessive amount of the catalyst, and possibly causes precipitation of the polymer due to the insolubility of the hydrogenated polymer. Contrarily, the reaction temperature of above 150° C. produces many different catalytic species or decomposes the catalyst to cause gelation or decomposition of the polymer, and readily leads to a hydrogenation of the aromatic double bonds to deteriorate the selectivity of the hydrogenation. More preferably, the reaction temperature is in the range of 50 to 140° C.

The pressure of the hydrogen used for the hydrogenation reaction is not specifically limited and preferably in the range of 1 to 100 kgf/cm$^2$. With the hydrogen pressure of less than 1 kgf/cm$^2$, the hydrogenation reaction rate decreases, requiring an excessive amount of the catalyst. With the hydrogen pressure of more than 100 kgf/cm$^2$, gelation of the polymer occurs actually as an unnecessary side reaction. More preferably, the hydrogen pressure is in the range of 2 to 30 kgf/cm$^2$. The optimal hydrogen pressure is selected in relation to the other hydrogenation conditions such as the added amount of the catalyst. Substantially, a high hydrogen pressure is preferred with a small amount of the hydrogenation catalyst.

The hydrogenation reaction time of the present invention is typically several to 1,440 minutes, preferably 30 to 360 minutes. The hydrogenation reaction of the present invention can be performed in the batch, continuous or other reaction type.

The progress of the hydrogenation reaction can be monitored by measuring the consumed amount of hydrogen.

In the present invention, a hydrogenated polymer can be produced so that more than 50%, preferably more than 90% of the unsaturated double bonds of the conjugated diene unit are hydrogenated. More preferably, in the case of hydrogenating a copolymer of conjugated diene and vinyl-substituted aromatic hydrocarbon, a copolymer of which the unsaturated double bonds of the conjugated diene unit is selectively hydrogenated can be obtained to provide more than 90% of the hydrogenation yield in the unsaturated double bond of the conjugated diene unit, and less than 5% of the hydrogenation yield in the aromatic double bond.

By using a highly active lithium hydride having a precisely controlled particle diameter as prepared from a reactor equipped with a high-speed injection nozzle, the present invention acquires a relatively high hydrogenation reaction rate and excellent reaction reproducibility, and improves the inefficiency such as long reaction time and uneconomic aspect of requiring high pressure and high-speed stirring in the conventional method of treating the active terminal of the living polymer or the alkyl lithium with hydrogen gas.

DETAILED DESCRIPTION OF THE INVENTION

Now, the present invention will be described in further detail by way of the following examples, which are not intended to limit the scope of the present invention.

SYNTHESIS EXAMPLE 1

Synthesis of Highly Active Lithium Hydride (LiH) from Reactor Equipped with High-Speed Injection Nozzle 980 g of an n-butyl lithium solution (in 2 M cyclohexane) and 2,160 g of tetrahydrofuran were added to 8,900 g of cyclohexane in a loop-type 15l-reactor equipped with a high-speed injection nozzle, a circulating pump and a heat exchanger in the inert gas atmosphere. The reaction was performed for one hour while the temperature of the reactor was kept at the room temperature (within 30° C.) and the gaseous hydrogen was injected into the reactor through the high-speed injection nozzle to maintain the hydrogen pressure of 10 kgf/cm². The mixed solution was turned to a white suspension. The end point of the reaction was checked by visual inspection when there was no change in color of the partly collected solution with a styrene monomer added. If there were non-reacted alkyl lithium in the solution, then it would instantly appear yellowish due to the polymerization reaction with the styrene monomer. After one hour of the reaction, the end point was determined through a styrene test. The mixed solution was then analyzed in regard to the particle diameter with a particle size analyzer.

The particle diameter of the lithium hydride measured with the particle size analyzer was 280 nm in z-average value.

SYNTHESIS EXAMPLE 2

Synthesis of Lithium Hydride (LiH) from Batch Reactor 980 g of an n-butyl lithium solution (in 2 M cyclohexane) and 2,160 g of tetrahydrofuran were added to 8,900 g of cyclohexane in a 15l-autoclave reactor in the inert gas atmosphere. The reaction was performed for one hour in the reactor kept at the room temperature with stirring at 1,000 rpm, and the gaseous hydrogen was injected into the reactor to maintain the hydrogen pressure of 10 kgf/cm². To determine the end point of the reaction, part of the solution collected was reacted with a styrene monomer and instantly turned yellow as checked by visual inspection. The reason of this change of color was because the non-reacted alkyl lithium remaining in the solution participated in the polymerization reaction with the styrene monomer and turned yellow. After one more hour of the reaction, the solution still appeared yellowish through the reaction with the styrene monomer and, after two more hours of the reaction, the reaction approached the end point. Subsequently, the mixed solution was analyzed in regard to the particle diameter with a particle size analyzer.

The particle diameter of the lithium hydride measured with the particle size analyzer was 3,987 nm in z-average value.

SYNTHESIS EXAMPLE 3

Solid Lithium Hydride for Commercial Purpose

A lithium hydride powder commercially available with 30 mesh was suspended in cyclohexane to prepare a suspension.

SYNTHESIS EXAMPLE 4

Synthesis of Low-Viscosity Styrene-Butadiene-Styrene Block Copolymer 11 g of tetrahydrofuran, 124 g of a styrene monomer, and 16 mmol of n-butyl lithium were added to 4,800 g of cyclohexane in a 10 l-autoclave reactor. After 30 minutes of polymerization, 552 g of a 1,3-butadiene monomer was added to the reactor and kept for one hour of polymerization. Finally, 124 g of a styrene monomer was added and kept for 30 minutes of polymerization. The active terminal of the living polymer thus obtained was deactivated with trimethylsilyl chloride added in the same mole as the polymerization initiator, n-butyl lithium. The polymer thus obtained was a styrene-butadiene-styrene block copolymer of which the bound styrene content was 31.0%, the 1,2-vinyl bond content of the 1,3-butadiene unit was 38.5%, and the number average molecular weight was about 50,000.

SYNTHESIS EXAMPLE 5

Synthesis of Medium-Viscosity Styrene-Butadiene-Styrene Block Copolymer 11 g of tetrahydrofuran, 120 g of a styrene monomer, and 13 mmol of n-butyl lithium were added to 4,800 g of cyclohexane in a 10 l-autoclave reactor. After 30 minutes of polymerization, 560 g of a 1,3-butadiene monomer was added to the reactor and kept for one hour of polymerization. Finally, 120 g of a styrene monomer was added and kept for 30 minutes of polymerization. The active terminal of the living polymer thus obtained was deactivated with trimethylsilyl chloride added in the same mole as the polymerization initiator, n-butyl lithium. The polymer thus obtained was a styrene-butadiene-styrene block copolymer of which the bound styrene content was 29.6%, the 1,2-vinyl bond content of the 1,3-butadiene unit was 40.5%, and the number average molecular weight was about 65,000.

SYNTHESIS EXAMPLE 6

Synthesis of High-Viscosity Styrene-Butadiene-Styrene Block Copolymer 11 g of tetrahydrofuran, 116 g of a styrene monomer, and 4.5 mmol of n-butyl lithium were added to 5,600 g of cyclohexane in a 10 l-autoclave reactor. After 30 minutes of polymerization, 469 g of a 1,3-butadiene monomer was added to the reactor and kept for one hour of polymerization. Finally, 115 g of a styrene monomer was added and kept for 30 minutes of polymerization. The active terminal of the living polymer thus obtained was deactivated with trimethylsilyl chloride added in the same mole as the polymerization initiator, n-butyl lithium. The polymer thus obtained was a styrene-butadiene-styrene block copolymer of which the bound styrene content was 33.0%, the 1,2-vinyl bond content of the 1,3-butadiene unit was 39.5%, and the number average molecular weight was about 160,000.

SYNTHESIS EXAMPLE 7

Synthesis of Styrene-Butadiene Random Copolymer 100 g of tetrahydrofuran, 105 g of a styrene monomer, 696 g of a butadiene monomer, and then 8.0 mmol of n-butyl lithium were added to 4,800 g of cyclohexane in a 10 l-autoclave reactor. The reactant mixture was subjected to polymerization for one hour. The active terminal of the living polymer thus obtained was deactivated with trimethylsilyl chloride added in the same mole as the polymerization initiator, n-butyl lithium. The polymer thus obtained was a styrene-butadiene random copolymer of which the bound styrene content was 13.3%, the 1,2-vinyl bond content of the 1,3-butadiene unit was 57%, and the number average molecular weight was about 100,000.

SYNTHESIS EXAMPLE 8

Synthesis of Butadiene Homopolymer 800 g of a butadiene monomer and then 8.2 mmol of n-butyl lithium were added to 4,800 g of cyclohexane in a 10 l-autoclave reactor. The reactant mixture was subjected to polymerization for 2 hours. The active terminal of the living polymer thus obtained was deactivated with trimethylsilyl chloride added in the same mole as the polymerization initiator, n-butyl lithium. The polymer thus obtained was a butadiene homopolymer of which the 1,2-vinyl bond content of the butadiene unit was 10%, the cis content was 35% and the number average molecular weight was about 98,000.

EXAMPLES 1 TO 5

2,800 g of a polymer solution containing 400 g (310 g in the case of synthesis example 6) of each polymer prepared in the respective Examples 4 to 8 was added to a 5l-autoclave reactor, and the hydrogen gas was blown into the reactor. The highly active lithium hydride solution prepared in the Synthesis Example 1 was injected into the reactor so that the LiH/Ti mole ratio was 15/1. The mixture was then heated to 80° C. Subsequently, as a main catalyst, 0.2 mmol of monocyclopentadienyl(2,6-di-t-butyl-4-methylphenoxy)titanium dichloride per 100 g of the polymer was added to the polymer solution. The hydrogenation reaction was performed in the reactor with the hydrogen pressure of 10 kgf/cm$^2$ with stirring at 400 rpm (rotations per minute) for 180 minutes. After the completion of the reaction, the reactor was cooled down with the pressure lowered to the ambient pressure, and the reaction solution was added in methanol to precipitate the polymer.

The hydrogenated polymer thus obtained was then subjected to $^1$H-NMR analysis. As a final result, the hydrogenation yields of the butadiene unit and the styrene unit are presented in Table 1.

TABLE 1

| | Example | | | | |
|---|---|---|---|---|---|
| | 1 | 2 | 3 | 4 | 5 |
| Polymer | S4 | S5 | S6 | S7 | S8 |
| LiH | | | S1 | | |
| Main catalyst | Monocyclopentadienyl (2,6-di-t-butyl-4-methylphenoxy) titanium dichloride | | | | |
| Hydrogenation yield of Butadiene Unit (%) after 60 min | 99 | 99 | 98 | 98 | 98 |
| Hydrogenation yield of Butadiene Unit (%) after 120 min | 99 | 99 | 98 | 98 | 99 |
| Hydrogenation yield of Butadiene Unit (%) after 180 min | 99 | 99 | 99 | 98 | 99 |
| Hydrogenation yield of Styrene Unit (%) | <1 | <1 | <1 | <1 | <1 |

Note)
S1: Synthesis Example 1
S4: Synthesis Example 4
S5: Synthesis Example 5
S6: Synthesis Example 6
S7: Synthesis Example 7
S8: Synthesis Example 8

COMPARATIVE EXAMPLES 1 TO 5

The hydrogenation procedures were performed in the same manner as described in the above Examples, excepting that the polymers prepared in the Synthesis Examples 4, 5 and 6 were used with lithium hydride prepared in the Synthesis Examples 2 and 3 as a cocatalyst. The results are presented in Table 2.

TABLE 2

| | Example | | | | |
|---|---|---|---|---|---|
| | 1 | 2 | 3 | 4 | 5 |
| Polymer | S4 | S5 | S6 | S4 | S5 |
| LiH | | S2 | | | S3 |
| Main catalyst | Monocyclopentadienyl (2,6-di-t-butyl-4-methylphenoxy) titanium dichloride | | | | |
| Hydrogenation yield of Butadiene Unit (%) after 60 min | 43 | 25 | 10 | N/R | N/R |
| Hydrogenation yield of Butadiene Unit (%) after 120 min | 45 | 26 | 11 | N/R | N/R |
| Hydrogenation yield of Butadiene Unit (%) after 180 min | 45 | 26 | 11 | N/R | N/R |
| Hydrogenation yield of Styrene Unit (%) | <1 | <1 | <1 | N/R | N/R |

Note)
S2: Synthesis Example 2
S3: Synthesis Example 3
S4: Synthesis Example 4
S5: Synthesis Example 5
S6: Synthesis Example 6
N/R: No reaction

EXAMPLES 6 TO 9

The hydrogenation procedures were performed in the same manner as described in the above Examples, excepting that Bis(cyclopentadienyl)titanium dichloride was used as a main catalyst. The results are presented in Table 3.

TABLE 3

|  | Example | | | |
|---|---|---|---|---|
|  | 6 | 7 | 8 | 9 |
| Polymer | S4 | S5 | S6 | S7 |
| LiH | S1 | | | |
| Main catalyst | Bis(cyclopentadienyl)titanium dichloride | | | |
| Hydrogenation yield of Butadiene Unit (%) after 60 min | 99 | 98 | 98 | 98 |
| Hydrogenation yield of Styrene Unit (%) | <1 | <1 | <1 | <1 |

Note)
S1: Synthesis Example 1

EXAMPLES 10 TO 13

The hydrogenation procedures were performed in the same manner as described in the above Examples, excepting that the lithium hydride prepared in the Synthesis Example 1 had a LiH/Ti mole ratio of 4/1, 10/1, 15/1 or 30/1. The results are presented in Table 4.

TABLE 4

|  | Example | | | |
|---|---|---|---|---|
|  | 10 | 11 | 12 | 13 |
| Polymer | S4 | | | |
| LiH/Ti (mole ratio) | 4/1 | 10/1 | 15/1 | 30/1 |
| LiH | S1 | | | |
| Main catalyst | Bis(cyclopentadienyl)titanium dichloride | | | |
| Hydrogenation yield of Butadiene Unit (%) after 60 min | 93 | 98 | 99 | 99 |
| Hydrogenation yield of Styrene Unit (%) | <1 | <1 | <1 | <1 |

Note)
S1: Synthesis Example 1
S4: Synthesis Example 4

EXAMPLES 14, 15 AND 16

Reproducibility Test

The hydrogenation procedures were performed for the polymer prepared in the Synthesis Example 4 with the reaction of the Example 6, i.e., while the lithium hydride of the Synthesis Example 1 had a fixed LiH/Ti mole ratio of 15/1. And, these procedures were repeated three times. The results are presented in Table 5.

TABLE 5

|  | Example | | | |
|---|---|---|---|---|
|  | 6 | 14 | 15 | 16 |
| Polymer | S4 | | | |
| LiH/Ti (mole ratio) | 15/1 | | | |
| Lithium Hydride | S1 | | | |
| Main catalyst | Bis(cyclopentadienyl)titanium dichloride | | | |
| Hydrogenation yield of Butadiene Unit (%) after 60 min | 99 | 99 | 99 | 99 |

TABLE 5-continued

|  | Example | | | |
|---|---|---|---|---|
|  | 6 | 14 | 15 | 16 |
| Hydrogenation yield of Styrene Unit (%) | <1 | <1 | <1 | <1 |

Note)
S1: Synthesis Example 1
S4: Synthesis Example 4

As described above, the polymer hydrogenation process using a highly active lithium hydride of a precisely controlled particle diameter as prepared from a reaction equipped with a high-speed injection nozzle guarantees stable hydrogenation reaction rate and high reproducibility, solves the uneconomic problem of requiring high pressure and high-speed stirring in the conventional methods of terminating the active terminal of a living polymer by hydrogen gas, reduces the reaction time through an enhanced reactivity, and provides a high hydrogenation activity by quantitatively controlling the LiH/Ti mole ratio in the hydrogenation of conjugated diene polymers having different molecular weights.

What is claimed is:

1. A process for hydrogenation of a conjugated diene polymer, the process comprising:
    (a) polymerizing or copolymerizing at least one conjugated diene in a hydrocarbon solvent using an organic alkali metal polymerization initiator to prepare a living polymer;
    (b) adding a terminating agent selected from amines, esters, ketones or halogen compounds to deactivate an active terminal of the living polymer; and
    (c) selectively hydrogenating the conjugated diene polymer using at least one organotitanium compound and a highly active lithium hydride having a z-average particle diameter less than 2,000 nanometers, which is prepared by reacting an alkyl lithium solution with gaseous hydrogen in a loop-type reactor equipped with an injection nozzle, a circulating pump and a heat exchanger, the organotitanium compound being represented by

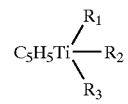

where $R_1$, is selected from cyclopentadienyl, $C_1$ to $C_8$ alkoxy, $C_6$ to $C_{20}$ aryloxy, or halogen; and $R_2$ and $R_3$ are the same or different and selected from halogen, $C_1$ to $C_8$ alkyl or alkoxy, $C_6$ to $C_{20}$ arylalkyl or aryloxy, or $C_7$ to $C_{20}$ alkoxyaryl or carbonyl.

2. The process as claimed in claim 1, mole ratio of the highly active lithium hydride to organotitanium compound is in the range of 2:1~30:1.

3. The process as claimed in claim 1, wherein the highly active lithium hydride has a z-average particle diameter of less than 500 nanometers.

4. The process as claimed in claim 1, wherein the organic alkali metal polymerization initiator includes an organolithium compound.

5. The process as claimed in claim 1, wherein the hydrocarbon solvent is selected from aliphatic hydrocarbons such as n-pentane, n-hexane, n-heptane, or n-octane; aliphatic cyclic hydrocarbons such as cyclohexane, or cycloheptane; ethers such as diethylether, or tetrahydrofuran; or aromatic hydrocarbons such as benzene, toluene, xylene, or ethylbenzene.

6. The process as claimed in claim 1, wherein the represented organotitanium compound includes monocyclopentadienyl(2,6-di-t-butyl-4-methylphenoxy) titanium dichloride, or bis(cyclopentadienyl)titanium dichioride.

7. The process as claimed in claim 1, wherein the conjugated diene includes isoprene or butadiene.

8. The process as claimed in claim 1, wherein the terminating agent includes at least one selected from the group consisting of benzyl chloride, benzyl bromide, benzyl iodide, methyl chloride, methyl bromide, methyl iodide, ethyl chloride, ethyl bromide, ethyl iodide, butyl chloride, butyl bromide, butyl iodide, acetone, methylisobutylketone, diphenylketone, methanol, ethanol, isopropanol, butanol, phenol, cresol, 2,6-di-t-butyl-4-methyl phenol, ethylacetate, butylacetate, trimethylsilylfluoride, trimethylsilylchloride, trimethylsilylbromide, trimethylsilyliodide, triethylsilylfluoride, triethylsilylchloride, triethylsilylbromide, triethylsilyliodide, tributylsilylfluoride, tributylsilylchloride, tributylsilylbromide, tributylsilyliodide, triphenylsilylfluoride, triphenylsilylchloride, triphenylsilylbromide, and triphenylsilyliodide.

* * * * *